May 2, 1961 M. MENDLOWITZ 2,982,132
CALORIMETRIC METHOD AND APPARATUS FOR CONTINUOUS
RECORDING OF HEAT ENCHANGE BETWEEN BODIES
Filed July 24, 1956 2 Sheets-Sheet 1
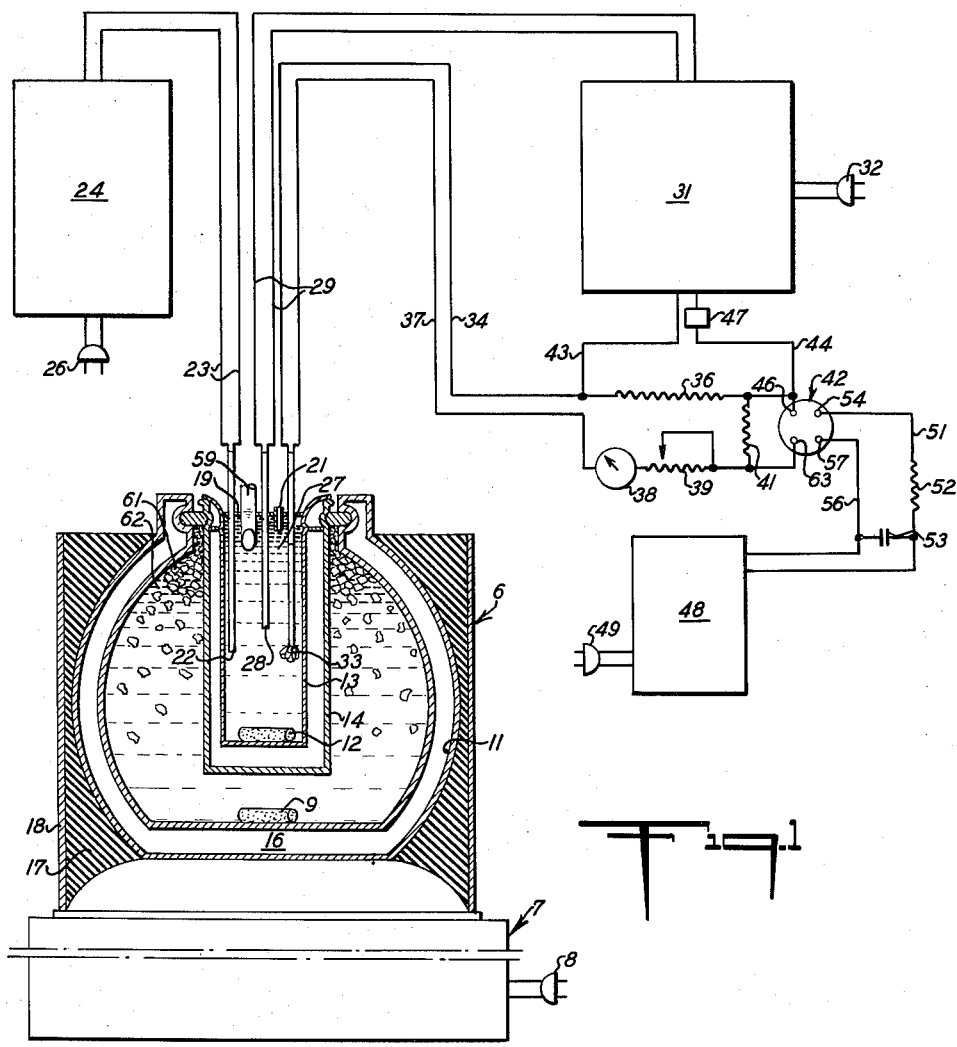
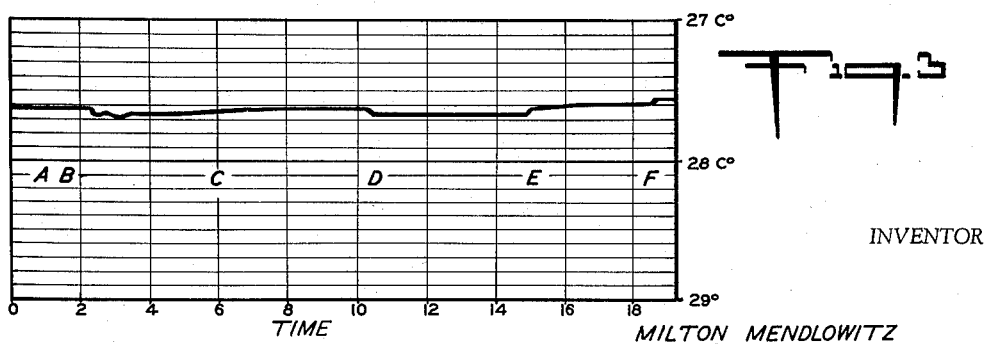
INVENTOR
MILTON MENDLOWITZ
BY
George H. Corey
ATTORNEY

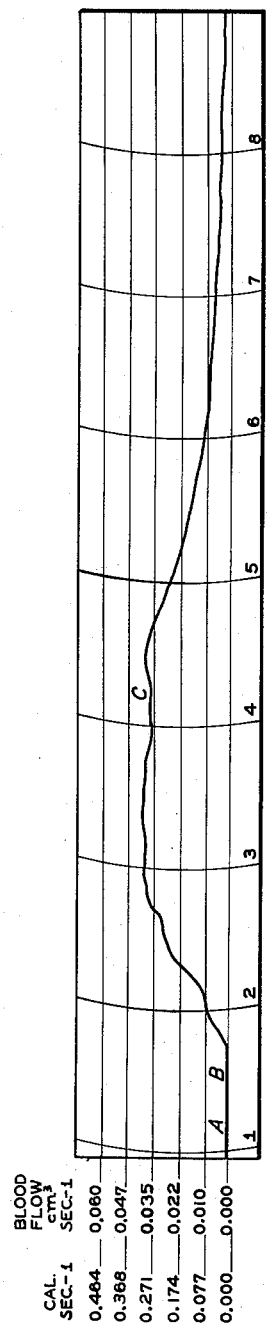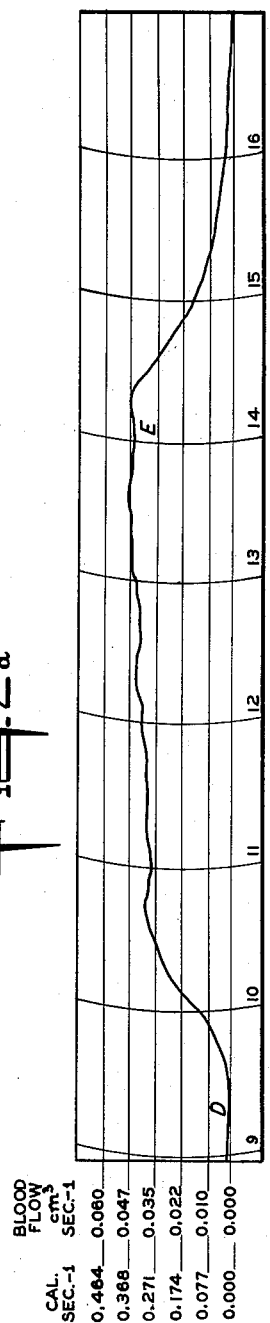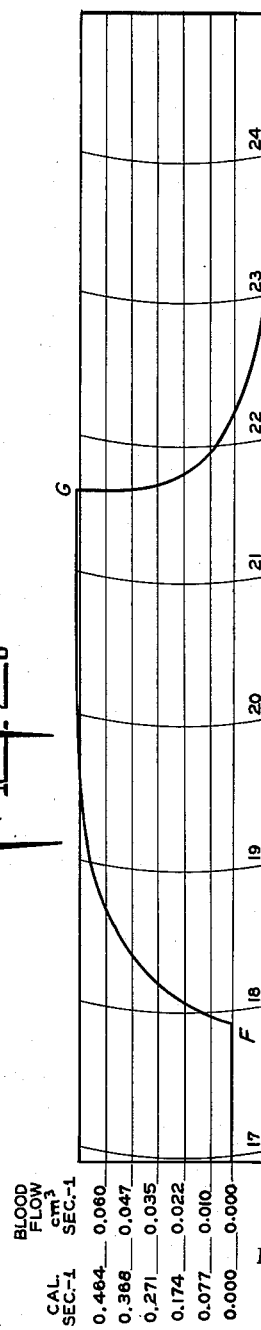

United States Patent Office 2,982,132
Patented May 2, 1961

2,982,132

CALORIMETRIC METHOD AND APPARATUS FOR CONTINUOUS RECORDING OF HEAT EXCHANGE BETWEEN BODIES

Milton Mendlowitz, New York, N.Y., assignor to Mount Sinai Hospital Research Foundation, Inc., New York, N.Y., a membership corporation of New York Filed July 24, 1956, Ser. No. 599,731

10 Claims. (Cl. 73—190)

This invention relates to the continuous recording of heat exchange between bodies by calorimetric methods without recording the temperatures of the bodies during the process and is particularly concerned with continuous recording calorimetric flow meters that record in either calories per unit time or unit of flow per unit time. A particular application is the recording of the flow of blood through a body member without penetration of instruments into or discomfort of the body.

The calorimetric method for measuring blood flow has been known for many years and was based on the principle that if the total caloric output of a hand is measured and the arterio-venous temperature difference during the period is known, the amount of blood flowing through the hand can be computed. A calorimeter was constructed by G. N. Stewart along these principles, the temperature of the arterial blood being assumed to be identical with mouth temperature and the temperature of the calorimeter set from 5 to 15° C. lower than the mouth temperature with the implication that all the blood passing through the hand was effectively cooled to the temperature of the calorimeter. However, it was later shown that the temperature of the venous blood returning from the hand could be several centigrade degrees higher than the calorimeter temperature evidently because of uncooled blood from the deeper tissues that were not affected particularly by the immersion of the hand into the liquid bath of the calorimeter.

Several years later this technique was used to measure the heat output of the fingertip and it was found that the heat output here could be converted without appreciable error to blood flow evidently due to the fact that almost all of the blood flowing through the finger passes through arterio-venous anastomosis near the surface, particularly if only the terminal phalanx is used for the testing. To compute blood flow with this method it was necessary to use the following formula (all temperatures centigrade):

$$Q = \frac{(\Delta t_1 + \Delta t_2)(m+e)}{\rho \phi a (t_3 - t_4)} \quad (1)$$

where $Q$ = blood flow in cc. per cm.$^2$ per min.
$\Delta t_1$ = temperature rise of the calorimeter per minute with the digit inserted.
$\Delta t_2$ = temperature fall per minute due to the difference between calorimeter and room temperature, a cork replacing the digit.
$m$ = volume or weight of water in the cup.
$e$ = hydrothermic equivalent of the cup, the thermometer bulb mercury, the metal, if any, of the stirrer, and the digit.
$\rho$ = specific heat of the blood.
$\phi$ = specific gravity of the blood.
$a$ = surface area of the digit in cm.$^2$.
$t_3$ = temperature of arterial blood (mouth temperature minus 0.7° C.).
$t_4$ = temperature of venous blood (average calorimeter temperature).

The early digital calorimeter has been improved by others by adding a heat source to the water cup which presumably compensates for heat loss of the cup to the atmosphere. However, any changes in atomspheric conditions between preliminary tests without a digit to determine the amount of heat input compensation necessary and the subsequent actual tests with the digit inserted will cause this method to be in error. Furthermore, to insure validity of results it is necessary that the various temperature readings be taken with extreme accuracy. Also, the complicated formula set out above must be utilized to determine the results. In addition, for the first few minutes readings are often too high due to the loss of retained heat from the digit to the calorimeter. Moreover, once the calorimeter bath approaches close to the temperature of the arterial blood there is no longer enough temperature differential to cool the venous blood effectively or to give reliable data.

It is an object of this invention to provide a calorimetric flow meter that has particular utility for measurement of blood flow through a body member, that has extreme accuracy relative to prior devices, operates continuously over a prolonged period of time, is extremely simple, can be operated by unskilled personnel, and will record directly in calories per unit time or volume flow per unit time.

It is another object of this invention to provide a continuous recording calorimetric flow meter that will have industrial applications other than the medical application described hereinbefore.

It is a further object of this invention to provide a continuous recording calorimeter that may be utilized to measure a continuing heat exchange without regard to liquid flow.

The nature of these and other objects will be more apparent and the invention will be more fully understood by reference to the drawings, the accompanying detailed description and the appended claims.

I have found that a digital calorimeter having a constant temperature environment external to the heat exchange cup and a heat input source to the heat exchange cup to maintain the temperature therein constant can be utilized to measure effectively and accurately the heat exchange from a digit or any other body to the heat exchange cup by measuring the heat input necessary to maintain the constant temperature in the cup, making an allowance, of course, for the heat input necessary to maintain the constant temperature of the cup when the digit is not present therein.

In other words, there is a constant heat loss from a heat exchange cup maintained at a constant temperature to a colder environment also maintained at a second constant temperature. The heat loss is thus equal to the heat input to the cup. If the heat input sources are an electrical heater and a digit, the amount of electrical input will be lowered in an amount equal to the input from the digit and measurement of the electrical input will in effect be measurement of the digit input. Since it is known that the input from the digit is effectively due to blood flow therethrough, the measurement of less electrical input is effectively measurement of blood flow through the digit.

If this heat input is supplied by an electrical source the electrical input may be passed through a thermocouple having an output proportional to the square of the input and the output can be calibrated and recorded rectilinearly in terms of calories per unit time which in turn can be translated to cc. of blood flow per unit time if desired. If calories H are produced by a current I through a resistance R, the following formula is applicable:

$$H = \frac{1}{4.128} RI^2 \text{(cal./sec.)} \quad (2)$$

and if R is constant, H is proportional to $I^2$. As pointed out before, the voltage produced by the thermocouple is proportional to $I^2$. Thus a voltmeter in the thermocouple output circuit can be calibrated rectilinearly in terms of calories per second with a known resistance and current. Thereafter the variable current can be measured in terms of calories which can be converted to blood flow if desired by the formula:

$$Q = \frac{H_f}{K(t_a - t_v)} \quad (3)$$

where $Q$ = blood flow in cc./sec.
$H_f$ = cal./sec. from digit
$t_a$ = temperature arterial blood (mouth temperature minus 0.7° C.)
$t_v$ = temperature venous blood (calorimeter temperature)
$K$ = product of specific heat and specific gravity of blood obtainable from the hematocrit.

The assumption for $t_a$ holds it room temperature is above 26° C. and general digital skin temperature above 28° C.

In the drawings:

Fig. 1 is a diagrammatic view of a digital calorimeter constructed in accordance with my invention;

Figs. 2a, 2b and 2c show respective segments of a continuous recording made with the apparatus of Fig. 1 over a period of time and varying conditions to exemplify the operation of the apparatus; and Fig. 3 shows a temperature recording of the heat exchange cup during the recording of Fig. 2.

Referring to the drawings in detail, this invention as illustrated is embodied in a blood recording digital flow meter that is intended specifically to measure blood flow in a finger or toe but which could readily be modified to the measurement of caloric output of other body members, and in fact the entire body of an animal such as a fish.

The calorimeter is generally indicated at 6 and includes a motor driven magnetic stirrer 7 (Labline #1270) which is connected to an electrical source at 8 and serves to drive stirring rod 9 within the silver evacuated Dewar flask 11 and stirring rod 12 within the inner aluminum cup 13. The inner or heat exchange cup 13 is enclosed within an outer aluminum cup 14 which in turn is enclosed within the Dewar flask 11 which is in effect a double-walled chamber having an enlarged vacuum space 16 surrounding the inner portion of the chamber that accommodates an ice 61 and water 62 mixture. The Dewar flask 11 is surrounded by a hard rubber filling 17 which in turn is encased within an aluminum sheath 18, these various features being provided to minimize the loss of heat from the system. Stretched over the top of the inner aluminum cup 13 is a continuous water-tight rubber membrane 19 provided with a water sealed air vent 21 and various other openings which are kept closed, generally by working parts of the apparatus, during operation of the apparatus to minimize heat loss.

A platinum resistance thermometer 22 (Leeds and Northrup #8164) is inserted through the rubber membrane and is connected by leads 23 to a temperature recorder 24 (Leeds and Northrup—Speedomax Type G—#61151), the latter being connected to an electrical source at 26. This unit for measuring the temperature can be replaced by a non-recording thermometer or omitted. It is maintained only as a check to see if the temperature of the liquid 27 in the heat exchange cup 13 remains constant.

A thermistor 28 (E. H. Sargent #81630) also extends through the rubber membrane into the liquid of the inner aluminum cup and is connected by leads 29 to a thermoregulator 31 (E. H. Sargent #S82050) which in turn is connected to an electrical source at 32. A coiled resistance wire or heating unit 33 is also inserted through the rubber membrane into the inner aluminum cup liquid and is connected to thermoregulator 31 on the side opposite the thermistor 28 through a circuit that includes several elements. The heating unit may be 2½ feet of coiled resistance wire as obtained from Driver Harris (Advance 0.008″ gauge 4.59 ohms per foot, nylon insulated) soldered to insulated copper leading wires. Lead 37 from the heating unit 33 passes through a milliammeter 38 (Simpson #378), continues through a variable resistance 39, then past a shunt resistance 41 to pole 63 of a thermocouple 42 (Weston Electric Instrument #99.97R). The lead 34 from the heating unit 33 passes a connection lead 43 from the thermoregulator, passes through resistance 36, then past shunt resistance 41, then past a connection lead 44 from the thermoregulator and is connected to pole 46 of the thermocouple. The resistances 36 and 39 are sufficient to put a 250 watt load on the output of the thermoregulator giving a maximum current through the milliammeter 38 of 600 milliamperes. To avoid shock to inadvertently grounded patients it is desirable to insert an isolation transformer 47 (Terminal Radio UTC-R74, 1 to 1) between the thermoregulator and the resistances. The other two poles of the thermocouple are connected to a photoelectric potentiometer recorder 48 (General Electric #8CE5EJ7) which in turn is connected to an electrical source at 49. Lead 51 passes from pole 54 of the thermocouple through a filtering resistance 52 of 1000 ohms (to protect the recorder) to the recorder. Lead 56 passes from pole 57 of the thermocouple to the recorder. A condenser 53 (Solar-type DZP, 10,000 mfd., 25 v. D.C., D4) is connected across the circuit to smooth out the pulsatile output current from the thermoregulator. Although not shown, it is preferred to have two condensers in parallel instead of a single condenser.

A finger 59 is also shown extending through the rubber membrane into the liquid of the aluminum cup to the first joint.

Using a magnetic stirrer and starting with a 50% mixture of cracked ice and water, it has been found by repeated zero checks that the heat loss of the heat exchange system here, namely, the liquid in the inner heat exchange cup 13, will remain constant and stable over a period as long as two hours. The thermoregulator 31 is set so that the temperature of the heat exchange cup will be 6 to 8° C. below the mouth temperature of the patient. Since this temperature is within the comfort zone of the human body, there is no tendency for the blood flow through the digit to change from the flow prior to insertion of the digit into the cup. At the same time, the temperature is far enough below the arterial temperature to create a sufficient heat exchange between the arterial blood and the water in the heat exchange cup to be accurately measurable.

The apparatus is first operated with a cork inserted into the heat exchange cup in place of finger 59 so as to determine the amount of heat necessary to maintain the constant temperature in the heat exchange cup, i.e., the heat necessary to compensate for the heat lost to the environment of the heat exchange cup, this heat loss being primarily to the ice-water mixture which remains constant and some through the membrane 19 to the air. This electrical input is calibrated as zero so that further recordings will represent an absolute flow of blood through the digit. When the finger is inserted into the heat exchange cup in place of the cork, the water in the cup will then absorb the heat radiated by the finger which is due to the heat loss of the blood which drops in temperature from the arterial temperature to the temperature of the heat exchange cup water while passing through the finger. This factor will in turn require less heat from the electrical source for maintaining the temperature of the liquid in the heat exchange cup at the predetermined constant level. Thus the difference in the heat required to maintain the constant water temperature before and after insertion of the finger is a measure of the heat radiated by the finger.

The thermoregulator 31 is a well known instrument for controlling temperature of a body by being connected with a thermistor 28, on the one hand, to determine the temperature, and with an electrical heating unit 33 to supply heat to the body, on the other. The regulator may, of course, be set at a desired temperature within its particular range of operation.

The electrical energy necessary to maintain the constant temperature of the aluminum cup must pass through a circuit including the thermoregulator 31 and the thermocouple 42. The thermocouple 42 is one wherein the primary current passing through poles 46 and 63 in the thermoregulator circuit induces a secondary current proportional to the square of the primary current to pass through poles 54 and 57 which are in the potentiometer recorder circuit. Thus the potentiometer will record a current (read in calories) proportional to the square of the primary current required to maintain the constant temperature of the heat exchange cup. Since calories are also proportional to the squared current, this recording may be calibrated in calories. Since the calories are the result of blood flow, the recording can also be directly calibrated in terms of blood flow.

Thus as long as the temperature in the Dewar flask 11 or thermal sink is maintained constant, which is much simpler to accomplish than attempting to maintain a constant air temperature in a room, there will be a constant heat loss from the liquid in the heat exchange cup 13. The difference in heat required to maintain the constant temperature in the heat exchange cup as compared with that required without the inserted finger will be a direct measurement of the heat expended by the finger which, as has been shown by others, is a measure of the flow of blood through the finger.

The recording shown in Figs. 2a, 2b and 2c of the drawing represents continuous operation through various conditions of the apparatus of this invention to illustrate more fully the operation thereof. This represents a single recording graph and is broken down here into three segments only because of drawing space requirements.

The apparatus as shown in Fig. 1 is first set up with a cork inserted into the rubber membrane instead of finger 59. The apparatus was then run between points A and B of the graph to establish an artificial zero corresponding to the input necessary to maintain the constant temperature in the heat exchange cup 13 to overcome the loss to the ice and water mixture and also to the atmosphere through the membrane 19. It will be noted from the straight line between A and B that this heat loss is constant and does not vary. It has been demonstrated by repeated experiments that the straight line A—B can be reproduced when the cork is in position.

At point B the cork was removed and the digital phalanx of a finger inserted into the calorimeter. Sympathetic nerve discharge had been inhibited by a half hour of previous indirect heating, this being done to insure a maximum blood flow through the finger for the purposes of this demonstration. The apparatus is capable, however, of measuring blood flow under a variety of conditions between normal and abnormal conditions. It will be noted that there is a response in about 10 to 15 seconds to the finger insertion and that it then takes about a minute to reach the level established by the insertion of the finger which in this case was about .037 cc. per second of blood flow or .29 calories per second.

At point C the brachial and digital arteries were occluded simultaneously with a blood pressure cuff and a Gaertner capsule, respectively, with the pressure maintained at 180 mm. of mercury, this being intended to eliminate the blood flow through the digit. It will be noted that there is almost an immediate decline in the record of blood flow and that in approximately five minutes the recording line was practically at zero. The slight difference exhibited between cork zero and finger zero is probably caused by the effect of anoxia in increasing the tissue digital metabolism as well as such residual blood flow as occurs despite apparent arterial occlusion.

At point D the pressure in the cup and capsule was released and thereafter we find the blood flow in the finger reaching a maximum height of .047 cc. per second which is probably due to the extra blood flow brought about to compensate for the period of no blood flow. At point E the finger was removed and the cork placed in the apparatus again and it will be noted that the zero level of line A—B was reproduced in a little more than two minutes and then maintained at a steady level.

At point F the thermoregulator was disconnected so that we have an absolute electric zero which is quickly reached by the apparatus and is above any recordings made during regular operation of the apparatus. Since the recorder in effect measures the reduction of current supplied to the heat exchange cup, the recorder has been arranged to move upward on the sheet for less current and downward for more current as a matter of convenience. At point G, 500 milliamperes of line current was introduced (necessary switching arrangement not shown) through the milliammeter 38 which is controlled by manipulation of the variable resistor 39, the thermoregulator 31 still being disconnected. The apparatus quickly reaches a level below the cork zero level indicating that the current necessary to maintain the constant temperature of the heat exchange cup with the cork in place, i.e., when the current from the thermoregulator is the only source of heat, is less than 500 milliamperes. The resistances 36 and 39 are sufficient to put a 250-watt load on the output of the thermoregulator giving a maximum current through the milliammeter 38 of 600 milliamperes. The shunt resistor 41 is provided to protect the thermocouple 42 and recorder 48 and is adjusted for maximal deflection on the recorder with 600 milliamperes.

The operation of the apparatus at absolute electric zero and subsequently at 500 milliamperes is necessary to calibrate the space between these two recordings so that an accurate reading of the regularly recorded current in calories per second can be determined. Similar readings are generally taken also prior to actual use of the apparatus for checking purposes and have been found to give identical results. The calibration in calories for the space between electric zero and 500 milliamperes of current is done by means of Formula 2 set out hereinbefore. This calibration is further checked by inserting a second heating wire of known resistance and, in place of the finger, passing varying currents through this wire. This procedure also indicates the overall time-lag of the measuring system. It has been found to respond within 5 seconds but may take 2 minutes to achieve complete equilibrium. The electrical measurements have been double-checked by measuring the calories per second developed by the second heating wire for various currents in a standard calorimeter and have been found to agree with the measurements of the present apparatus within 2%.

It will be appreciated that 500 milliamperes has been selected as being beyond the range necessary for operation of this apparatus. In other words, 500 milliamperes is more than enough to maintain the constant temperature of the heat exchange cup 13 when the cork is positioned in the apparatus. Since the heat of the finger is to be utilized later it will, of course, take less heat through the electrical source at that time to maintain the constant temperature. However, in operations where more water is concerned in the heat exchange cup or where the temperature differential is greater it might well be necessary to increase the capacity of the apparatus, i.e., to more than 500 milliamperes. Most of the individual instruments used in the present apparatus are conventional and available on the market as indicated by the manufacturer and model number being given herein.

Fig. 3 shows the continuous temperature record of the heat exchange cup 13 during the operations described with reference to Fig. 2 from steps A through F, after which the the thermoregulator was disconnected. The thermoregulator was set for 27.6° C. and the temperature was maintained below 27.7° C. at all times, even after insertion of the finger.

Although this apparatus has been shown as applying to the measure of a blood flow through a finger a similar device may be used for the toe (although a generally somewhat larger inner cup is used) and other body members or even an entire animal such as a fish might be immersed within the inner cup. It should be appreciated that although the insertion of the entire hand has been shown not to give accurate results as regards blood flow, the device would still be accurate in measuring the heat output of the hand. Use of the fingers and toes have been desirable in blood flow measurement because their heat output can be quickly correlated with blood flow. However, if one is merely interested in caloric output then other body members can be used.

It is intended that the principle not be limited to application to living organism but that it be extended to industrial applications where it is desired to determine heat output or to measure flow by heat output. For example, the flow of liquid through a system could be determined similarly by placing a coil of the liquid flow circuit into a device similar to the heat exchange cup making sure, of course, that the coil was of sufficient length and the volume of water or other liquid in the heat exchange cup was sufficient to cool the liquid whose flow is to be measured down to the temperature of the cup liquid. In fact, the elaborate set-up shown for the blood flow meter which is necessary for extreme accuracy would, in all probability, not be necessary in industrial applications where such accuracy was not required. However, the same system of recording in calibrated calories or flow could be developed and on rolls of graph paper provided for this purpose so that little attention by an operator would be required except for checking at intervals.

It will be appreciated also that the modification shown here has been one in which the inner cup water temperature is less than that of the fluid whose flow is to be measured, that being desirable particularly with blood which normally exhibits a drop in temperature in passing through the vascular beds from the arterial to the venous system. However, in other situations it might be desirable to have a higher temperature within the cup so that the temperature of the flowing fluid would be raised and this is considered to be within the scope of the present invention.

I claim:

1. A calorimetric heat measuring device comprising a first body of liquid within a primary heat exchange cup; a thermistor within said liquid to determine the temperature thereof; an electrical resistance in said first liquid; a thermoregulator operatively connected in a circuit to said resistance, said thermistor and an electrical source to maintain the temperature of said first liquid at a predetermined constant first level; a thermocouple in said circuit between said thermoregulator and said resistance adapted to emit a second current proportional to the square of first current in said circuit; a continuous recording meter operatively connected to said thermocouple for recording said second proportional squared current, and a thermal sink containing a second liquid and surrounding said primary cup, said sink being maintained at a second constant temperature below said first constant temperature.

2. A blood flow meter comprising a container of a first liquid adapted for insertion of a digit within said first liquid, a thermal sink containing a second liquid substantially surrounding said container and maintained at a second constant temperature, means for sensing the temperature of said first liquid, means for heating said first liquid, a thermoregulator operatively connected between said heating means and said sensing means to maintain said first liquid at a first constant temperature higher than said second constant temperature, and means to record the heat necessary to maintain said first constant temperature of said first liquid.

3. A blood flow meter comprising a container of liquid adapted for insertion of a digit within said liquid, a thermal sink containing a mixture of ice and water at a first constant temperature substantially surrounding said container, a thermistor positioned in said liquid for determining the temperature thereof, an electrical resistance positioned in said liquid, a thermoregulator operatively connected by a circuit between said thermistor and said resistance and adapted to maintain a second constant temperature of said liquid between said first constant temperature and arterial blood temperature, a thermocouple within the circuit between said thermoregulator and said resistance and adapted to emit a current in proportion to the square of the current in said circuit, and a photoelectric potentiometer continuous recorder operatively connected to said thermocouple to linearly record the quantity of said emitted current, said recording being proportional to heat input to said liquid from said resistance and inversely proportional to heat input to said liquid from said digit.

4. A process for continuously demonstrating heat exchange between a body and a first liquid adapted to receive said body comprising maintaining a second liquid at a second constant temperature below the temperature of said body, surrounding said first liquid with said second liquid, maintaining said first liquid at a first constant temperature above said second liquid temperature and different than the temperature of said body for a given period with said body therein and for another period without said body therein, and continuously recording the heat required to maintain said first constant temperature during said periods.

5. A process for continuously demonstrating heat exchange between a body and a first liquid adapted to receive said body comprising surrounding said first liquid with a thermal sink containing a second liquid at a second constant temperature below the temperature of said body, maintaining said first liquid at a first constant temperature between said second constant temperature and the temperature of said body for a given period with said body therein and for another period without said body therein, and continuously recording the heat required to maintain said first constant temperature during said periods.

6. A non-bleeding process for continuously demonstrating blood flow through a digit comprising providing a first liquid in a first container adapted for the insertion of said digit in said first liquid, maintaining a second liquid in a second container surrounding said first container and at a second constant temperature below arterial blood temperature, maintaining said first liquid at a constant temperature between said second constant temperature and said arterial blood temperature for a given period with said digit inserted and for another period without said digit therein, and continuously recording the heat required to maintain said first constant temperature during said periods whereby the difference in heat requirements of said periods may be translated to volume of blood flow through said digit.

7. A non-bleeding process for continuously demonstrating blood flow through a digit comprising providing a first liquid in a container adapted for the insertion of said digit in said liquid, surrounding said container with a thermal sink including a second liquid having a second constant temperature below the arterial blood temperature of said digit, maintaining said first liquid at a first constant temperature between said second constant temperature and the arterial blood temperature of said digit for a given period with said digit inserted and for another period without said digit inserted, and continuously recording the heat required to maintain said first constant temperature during said periods whereby the difference in heat requirements of said periods may be translated to volume of blood flow through said digit.

8. A non-bleeding process for continuously demonstrating blood flow through a digit comprising providing a liquid in a container adapted for insertion of said digit in said liquid, surrounding said container with a thermal sink having an ice and water mixture at a first constant temperature, heating said liquid with an electrical heating unit, maintaining said liquid at a second constant temperature between said first constant temperature and the arterial blood temperature of said digit with a thermoregulator operatively connected with said electrical heating unit for a given period with said digit inserted and for another period without said digit inserted, incorporating within the electrical circuit of said heating unit and said thermoregulator a thermocouple adapted to emit a second current in proportion to the square of the first current in said circuit, and continuously recording said emitted second current during said periods whereby the difference in recorded current for said periods may be translated to volume of blood flow through said digit.

9. A calorimetric device for continuously and indirectly measuring heat exchange comprising an inner liquid adapted to exchange heat with a foreign object inserted therein, an inner container for said inner liquid, an outer liquid maintained at a first constant temperature substantially surrounding said inner container, an outer container for said outer liquid, means to maintain said inner liquid at a second constant temperature greater than said first constant temperature whereby there is heat exchange at a constant rate between said liquids, and means for measuring the heat input necessary to maintain said inner liquid at said second constant temperature, whereby said measured heat input is equivalent to the total heat exchange from said inner liquid and the only variable heat exchange is that with said foreign body.

10. A calorimetric device for continuously and indirectly measuring heat exchange comprising an inner liquid adapted to exchange heat with a foreign object inserted therein, an inner container for said inner liquid, an outer liquid maintained at a first constant temperature substantially surrounding said inner container, an outer container for said outer liquid, an electrical heating unit positioned to apply heat to said inner liquid, means including said electrical heating unit to maintain a second constant temperature of said inner liquid greater than said first constant temperature whereby there is heat exchange at a constant rate between said liquids, and means for measuring the heat input necessary to maintain said inner liquid at said second constant temperature, whereby said measured heat input is equivalent to the total heat exchange from said inner liquid and the only variable heat exchange is that with said foreign body.

References Cited in the file of this patent

UNITED STATES PATENTS

| | | |
|---|---|---|
| 2,329,813 | Amsler | Sept. 21, 1943 |
| 2,347,661 | Butland | May 2, 1944 |
| 2,800,793 | Oliver | July 30, 1957 |

FOREIGN PATENTS

| | | |
|---|---|---|
| 963,743 | France | Jan. 12, 1950 |

OTHER REFERENCES

Book, Manual of Physiology by G. N. Stewart, published by W. Wood and Co., New York, 7th ed 1914, pp. 122, 123, 218 and 219.

Periodical, Journal of Scientific Instruments, vol. 31, December 1954, pp. 447–449.